United States Patent

Reimer

[15] 3,699,393

[45] Oct. 17, 1972

[54] PRINTED WIRING CARD FILE

[72] Inventor: William A. Reimer, Wheaton, Ill.

[73] Assignee: GTE Automatic Electric Laboratories, Incorporated, Northlake, Ill.

[22] Filed: Aug. 2, 1971

[21] Appl. No.: 168,236

[52] U.S. Cl. ...............317/99, 317/101 PH, 317/117

[51] Int. Cl. ...............H05k 7/18

[58] Field of Search .....317/99, 101 D, 100, 101 DH, 317/117, 122; 339/17 LM

[56] References Cited

UNITED STATES PATENTS

| | | | |
|---|---|---|---|
| 3,184,069 | 5/1965 | Rosenberg | 339/17 LM |
| 3,231,785 | 1/1966 | Cababro | 317/100 |
| 3,360,689 | 12/1967 | Haury | 339/17 LM |
| 3,098,177 | 7/1963 | Bleier | 317/101 DH |
| 3,264,598 | 8/1966 | Phelps | 339/17 LM |
| 3,377,515 | 4/1968 | Erb | 317/101 DH |
| 3,260,793 | 7/1966 | Edelman | 317/122 |

*Primary Examiner*—Robert K. Schaefer
*Assistant Examiner*—Gerald P. Tolin
*Attorney*—K. Mullerheim et al.

[57] ABSTRACT

A printed wiring card file including a support and stabilization structure to which notched card guide sections may be clamped. The card guides provide vertical alignment of the printed wiring cards and the support and stabilization structure may be arranged such as to accommodate wiring cards of any desired height.

8 Claims, 8 Drawing Figures

INVENTOR
WILLIAM A. REIMER

BY Robert Van Epps
ATTORNEY

PRINTED WIRING CARD FILE

BACKGROUND OF THE INVENTION

1. Field of the Invention

The present invention relates most generally to the field of printed wiring card filing devices and more particularly to an improved modular printed wiring card file.

2. Description of the Prior Art

In the many diverse uses of plug-in type printed wiring cards it is generally necessary to provide a card file which includes structural support for a group of wiring cards and a means for maintaining accurate inter-card spacing such that the cards plug easily into their associated connectors and cooling air is allowed to flow thereover. Prior to the present invention it has been the general practice to provide printed wiring card enclosures, typically of stamped metal, which are dimensioned to receive a particular standard size wiring card in a card guide affixed to the enclosure. This approach offers little if any flexibility in that a change in printed wiring card dimensions clearly dictates a corresponding change in card file dimensions. Although generally acceptable there are many applications wherein it is necessary or desirable to use a variety of printed wiring card sizes at various spacings and it is necessary that a like variety of different size card files be available. A circuit board mounting device typical of the prior art is described in U.S. Pat. No. 3,231,785 which issued to A. D. Calabro on Jan. 25, 1966.

OBJECTS AND SUMMARY OF THE INVENTION

From the foregoing discussion it will be understood that among the various objectives of the present invention are included:

The provision of a new and improved printed wiring card file;

The provision of apparatus of the above-described character which may be assembled in various dimensions from standard size component elements; and The provision of apparatus of the above-described character whereby the structural support, vertical alignment and inter-card spacing are economically provided.

These and other objectives of the present invention are efficiently achieved by providing generally planar support framework section preferably formed of an open wire grillwork and a plurality of printed wiring card guide and locator sections which are adapted to fit over and be secured to the support framework. Each of a plurality of support framework sections may be affixed to end plates to provide a card file of any desired dimension between sections.

The foregoing as well as other objects, features and advantages of the present invention will become more apparent from the following detailed description taken in conjunction with the appended drawings.

DESCRIPTION OF PREFERRED EMBODIMENTS

Figures 1, 2:
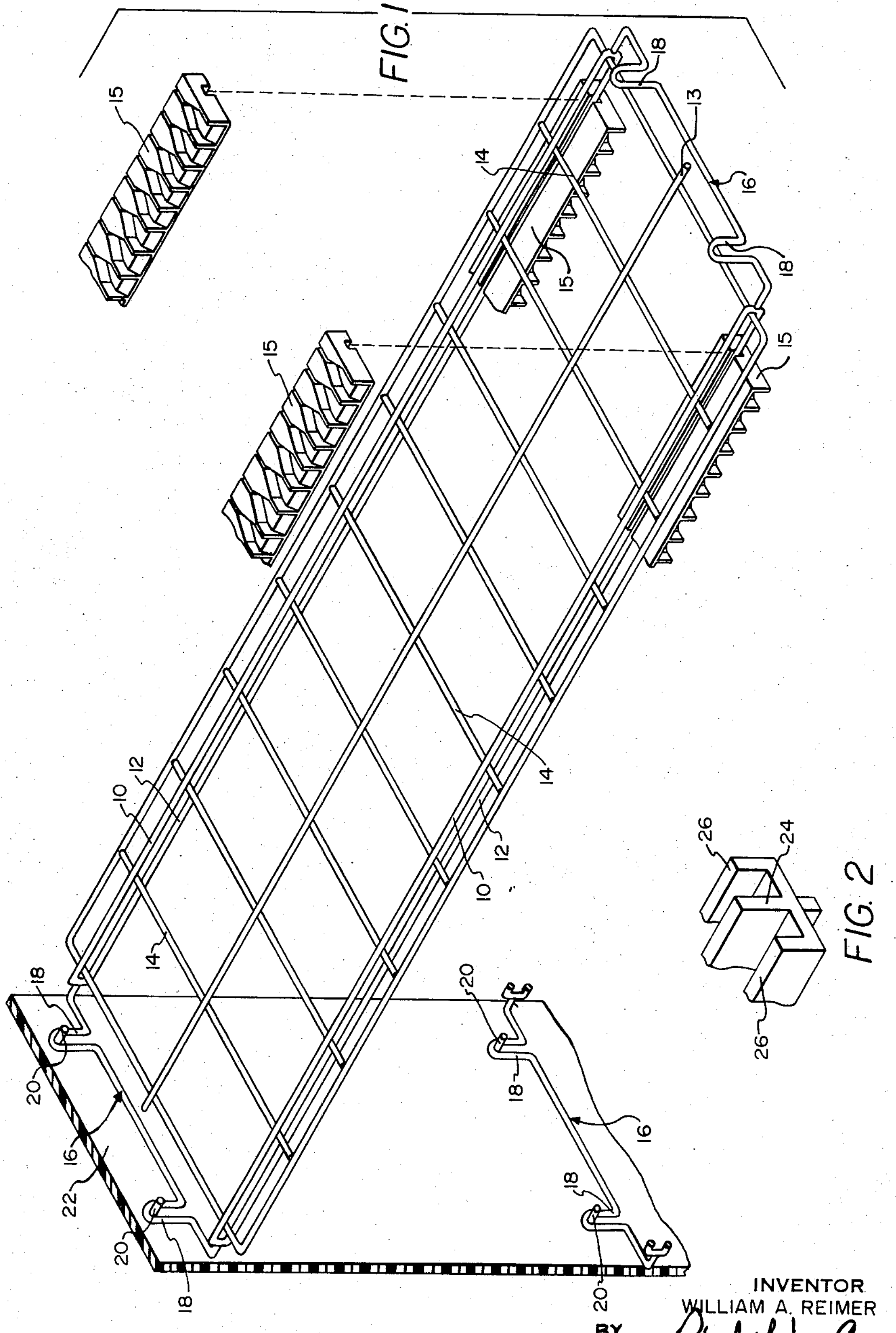
FIG. 1 is a perspective view of a wire grill support framework section of utility in the practice of the present invention.
FIG. 2 is a schematic partial view of an alternative embodiment of a support framework section in accordance with the principles of the present invention.

Turning now to FIG. 1 there is illustrated an open wire grillwork type of support framework. This type of support offers good thermal efficiency in that cooling air flow is impeded to a minimum degree. The framework includes longitudinally extending front and rear support members formed of first and second parallel wires 10 and 12 vertically spaced from one another by a plurality of spaced stabilizer wires 14 which provide the necessary rigidity and a stable mounting to receive wiring card guide and locators 15 to be presently described. An additional center support wire 13 may be used if loading of the framework makes its added structural strength desirable. Wire end mounting sections 16 are provided with suitable bended portions 18 adapted to engage an appropriate means 20 such as a screw, bolt, rivet or the like for securing the support framework to an end plate 22. The wire grillwork may be welded or brazed into a rigid framework of the desired dimensions. The resulting structure can accommodate a range of printed wiring card depths since the amount the card overhangs the front and/or rear edge of the framework can be varied. Various height wiring cards may also be easily accommodated by mounting the framework at the appropriate vertical spacing.

FIG. 2 illustrates an alternative embodiment of front and rear support members which is particularly adapted to heavy load applications such as where it is necessary to support printed wiring card mounted relays or transformers. The framework elements may be extruded and include an upright support member 24 which is flanked by stabilizing members 26. A portion of the support member 24 extends beneath the stabilizing members 26 such that the upper and lower edges of the support member 24 correspond to the upper and lower support wires 10 and 12 of FIG. 1.

Figures 3, 4A, 4B:
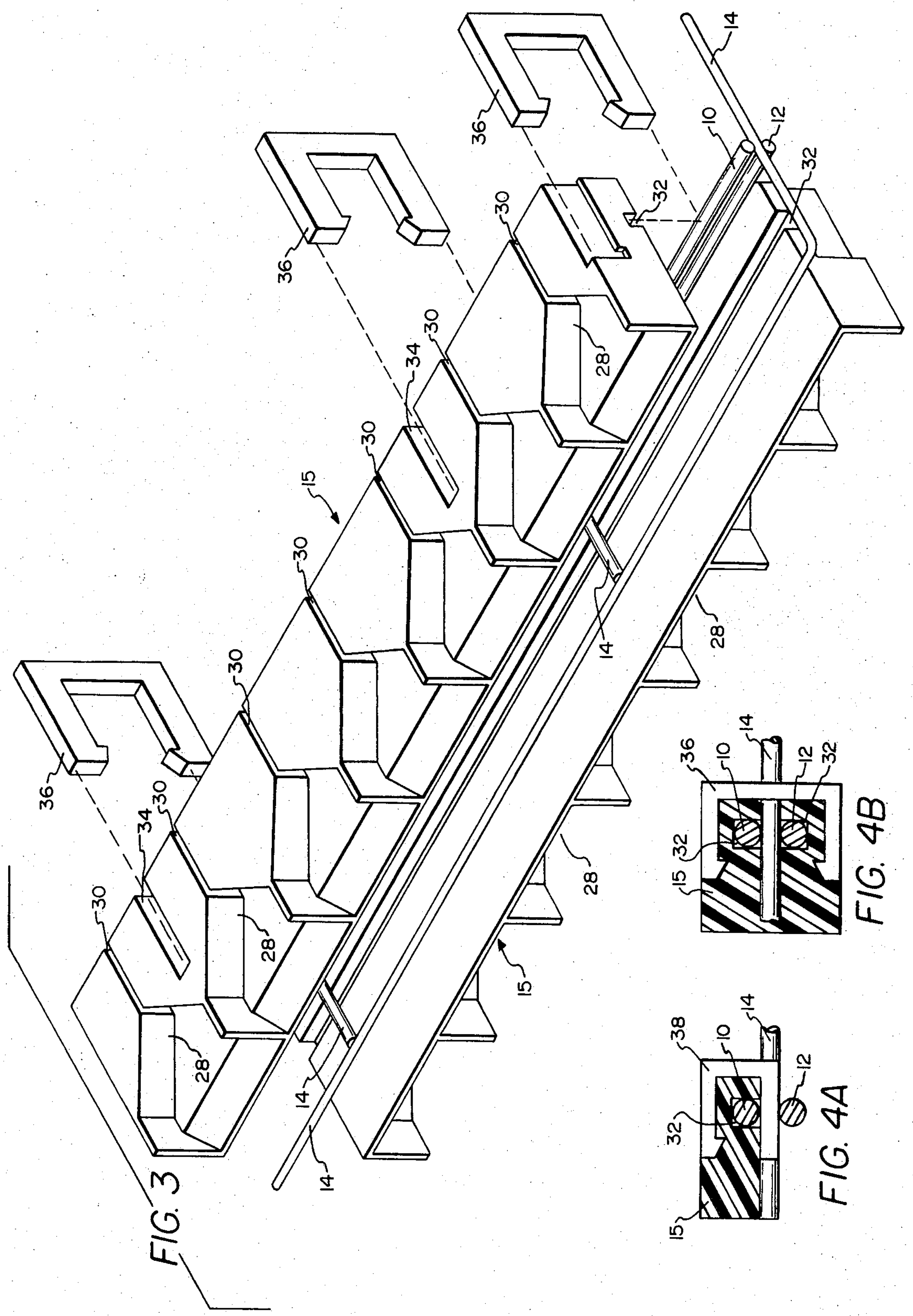
FIG. 3 is an exploded view of a printed wiring card guide and locator section illustrating the preferred means of its attachment to the support framework section of FIG. 1.
FIGS. 4A and 4B are cross sectional views of the apparatus of FIG. 3 in assembled form.

FIG. 3 illustrates in greater detail the structural features of the printed wiring card guide and the manner in which it may be affixed to the supporting framework of FIG. 1. Each guide 15 may conveniently be molded of any suitable plastic material and preferably is formed in a standard length. Transverse alignment slots 28 taper down to the wiring card guide groove 30 which is adapted to receive the edge of a printed wiring card (not shown). Each guide is provided with a longitudinal groove 32 on its reverse side which fits over one of the first and second support wires 10 and 12 of the support framework. The guide 15 is thus positioned front to rear by the support wire 10 and is further supported and constrained in rotation by the stabilizer wires 14. A plurality of recesses 34 are provided in the edge of the guide 15 which are adapted to receive and retain C-shaped locator clamps 36.

FIG. 4A illustrates a single card guide 15 assembled with the upper support wire 10 of a grillwork support structure and resting upon a stabilizer wire 14. A generally C-shaped single sided locator clamp 38 snaps into place thus holding the guide firmly in its desired position. It will be noted that the clamp 38 may be conveniently disposed immediately adjacent the stabilizer wire 14 thus precluding longitudinal misalignment of the guide 15. FIG. 4B illustrates the elements of FIG. 3 in their assembled form whereby a guide 15 may be disposed on each side of the grillwork supporting framework wires 10, 12 and 14 and wherein the remainder of the structural elements are identified as set forth hereinabove.

Figure 5:
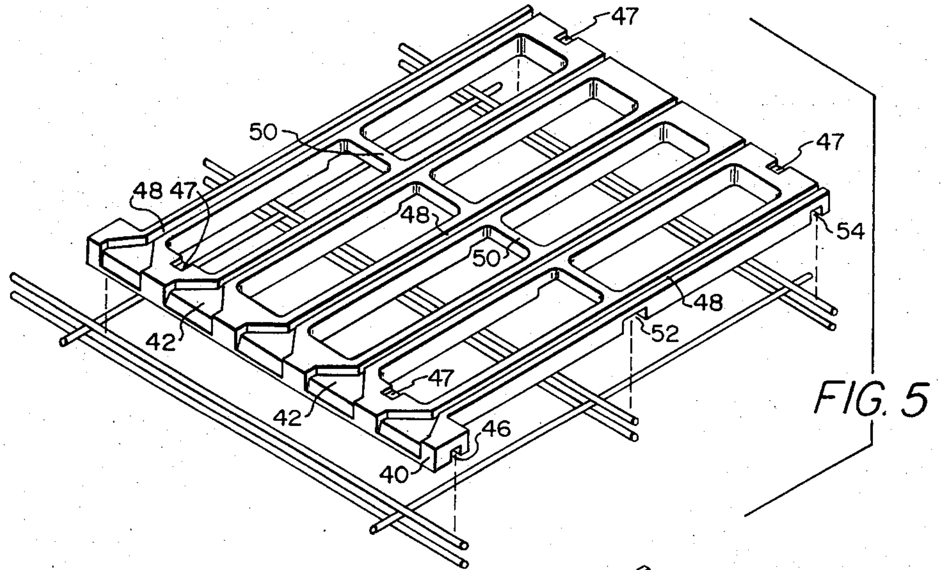
FIG. 5 is a schematic elevation view of an alternative embodiment of a printed wiring card guide and locator of utility in the practice of the present invention.

FIG. 5 illustrates a full length card guide which is of utility in the practice of the present invention and whereby alignment and support of a printed wiring card (not shown) along its complete edge is provided. The forward end portion 40 of this card guide is basically similar to the guide illustrated in FIG. 3, having transverse tapered alignment slots 42 and a wiring card engaging groove or trough 48. The longitudinal grooves 46 are adapted to engage the support wires 10 and recesses 47 receive C-shaped locator clamps (not shown) in the manner described hereinabove. The transverse card guide troughs 48 support and align the wiring card along substantially its full length. A transverse intermediate member 50 is provided with a longitudinal groove 52 adapted to engage a center support wire 13 and the rearward end of the card guide is similarly provided with a groove 54 to engage the support wire 10 and recesses 47 to receive locator clamps (not shown).

Figures 6A, 6B:
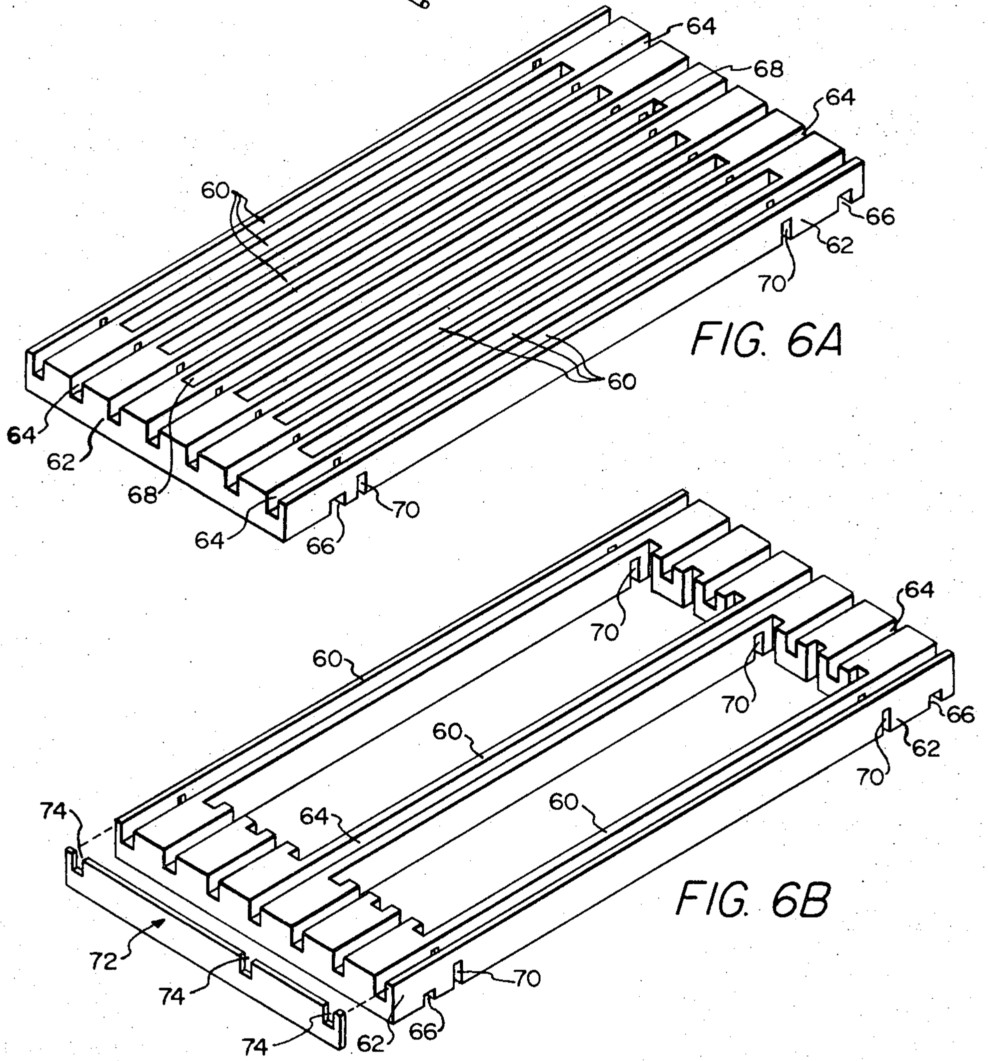
FIGS. 6A and 6B illustrate two views of a further alternative embodiment of a printed wiring card guide and locator useful with the mounting sections of FIGS. 1 and 2.

In order to take best economic advantage of standardized components it is desirable that a basic card guide be provided which is adapted to receive a variety of wiring card spacing. Such a card guide is illustrated in FIGS. 6A and 6B and comprises a plurality of parallel transverse card guide troughs 60 joined at each end to longitudinal members 62 having transverse wiring card guide grooves 64, longitudinal grooves 66 adapted to engage a supporting framework (not shown) of the type illustrated in FIGS. 1 and 2, and recesses 68 for receiving locator clamps (not shown) as illustrated in FIGS. 4A and 4B. Each card guide trough 60 is provided with a stress riser 70 at each end where the trough joins the longitudinal members 62. These stress risers 70 provide a fracture point to which a sharp impact may be applied to break any given trough 60 away from the longitudinal members 62. The card guide troughs 60 are preferably disposed at a least common wiring card spacing which may be found in a particular electronic system. As an illustrative example, if a given system requires the use of 0.450 and 0.600 inch card spacing, the least common spacing would be 0.150 inch. Thus not only 0.450 and 0.600 inch spacings would be made available but all multiples of 0.150 inch would also be possible through selective removal of guide troughs 60. In such an arrangement the maximum allowable area for cooling air flow is maintained while retaining considerable flexibility in the card spacing available. If desired a designation strip 72 having notches 74 corresponding to the usable card guide troughs 60 may be used to indicate guide positions which may be used and to mask those which may not. Alternatively a heat stamping approach may be employed to close off unused guide slots.

From the foregoing it will be seen that the present invention provides an improved printed wiring card file whereby the objectives set forth hereinabove are efficiently achieved. Since certain changes in the above-described construction will occur to those skilled in the art without departure from the scope of the invention it is intended that all matter contained in the description or shown in the various views of the appended drawings shall be interpreted as illustrative and not in a limiting sense.

Having described what is new and novel and desired to secure by Letters Patent, what is claimed is:

1. A printed wiring card file comprising:

a plurality of supporting frameworks, each having first and second longitudinally extending substantially parallel spaced members, stabilizing means fixed to and extending transversely between said first and second longitudinally extending members, and each said longitudinally extending member having an upper and lower portion extending vertically beyond said transversely extending stabilizing means;

a plurality of printed wiring card guide means each adapted at a first surface to receive and retain the edges of a plurality of printed wiring cards transversely to the longitudinal axis of said guides, having a longitudinally extending groove in a second surface thereof opposite said first surface, said groove in each of said guides engaging one of said upper and lower vertically extending portions of said longitudinally extending members, and also engaging said stabilizing means to thereby be constrained in rotation about said vertically extending portions, and having a plurality of recesses disposed in said first surface thereof;

clamping means engaging said recesses in said printed wiring card guides, to thereby removably secure said printed wiring card guides to each of said vertically extending portions of each of said longitudinally extending members; and means for mounting said plurality of supporting frameworks in substantially parallel planes in a fixed dimensional relationship with respect to one another such that said guide means disposed on vertically adjacent supporting frameworks retain opposite edges of printed wiring cards in a plurality of vertically adjacent horizontal arrays.

2. Apparatus as recited in claim 1 wherein said supporting frameworks each comprise a substantially rigid open wire grillwork including longitudinally extending front and rear support members formed of first and second vertically spaced apart parallel wires, a plurality of spaced stabilizer wires disposed between, fixed to, and extending transversely to said first and second longitudinal wires between said front and rear support members, and wire end mounting sections affixed to each end of said support members engaging said mounting means.

3. Apparatus as recited in claim 1 wherein said supporting frameworks each comprise longitudinally extending front and rear support members having a central upstanding portion and first and second parallel stabilizing portions fixed to said upstanding portion in a transversely spaced relation therewith.

4. Apparatus as recited in claim 1 wherein said printed wiring card guide means includes front and rear, elongate, substantially rectangular blocks, each having a plurality of transverse tapered alignment slots disposed in a first surface thereof, and having a like plurality of wiring card guide grooves in communication with the apex of said tapered alignment slots.

5. Apparatus as recited in claim 4 further including a plurality of substantially parallel card guide troughs extending transversely between and affixed to said front and rear blocks in communication with each of said wiring card guide grooves.

6. Apparatus as recited in claim 5 further including a stress riser disposed in each end of said card guide trough proximate said front and rear blocks such that selected ones of said troughs may be removed from said guide means.

7. Apparatus as recited in claim 6 wherein said card guide troughs are disposed at a least common spacing with respect to one another such that all multiples of said spacing are available for printed wiring card mounting through selective removal of said trough.

8. Apparatus as recited in claim 6 further including a designation means disposed on said front card guide block and having notches therein in alignment with selected ones of said alignment slots and operative to mask the remainder of said alignment slots.

* * * * *